W. J. BRANSON.
SINGLE PHASE MOTOR.
APPLICATION FILED SEPT. 8, 1908.

1,013,119. Patented Jan. 2, 1912.

WITNESSES:
C. L. Belcher
Otto S. Schainer

INVENTOR
Walter J. Branson
BY
Wesley G. Carr
ATTORNEY

UNITED STATES PATENT OFFICE.

WALTER J. BRANSON, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

SINGLE-PHASE MOTOR.

1,013,119.      Specification of Letters Patent.      Patented Jan. 2, 1912.

Application filed September 8, 1908. Serial No. 452,090.

*To all whom it may concern:*

Be it known that I, WALTER J. BRANSON, a citizen of the United States, and a resident of Wilkinsburg, in the county of Allegheny and State of Pennsylvania, have invented a new and useful Improvement in Single-Phase Motors, of which the following is a specification.

My invention relates to single-phase alternating current induction motors and particularly to starting means therefor.

The object of my invention is to so construct and arrange the windings of single-phase induction motors as to adapt such motors for operation at a plurality of substantially constant speeds and to permit starting thereof when arranged for any of said speeds.

The windings of poly-phase induction motors are frequently so arranged that the numbers of poles and, consequently, the motor speeds may be changed at will by adjusting the connections of the windings, either temporarily or permanently, within the motors or by means of controllers exterior thereto. In order that single-phase induction motors may be similarly constructed and operated, it is highly desirable and sometimes quite essential, especially when the adjustment of the connections of the windings is made within the motors, that the auxiliary windings be arranged to effect starting of the motors irrespective of the number of poles produced by the main windings.

The object of the present invention is to secure this result without changing the connections of the auxiliary windings when the connections of the main windings are changed.

Figure 1:
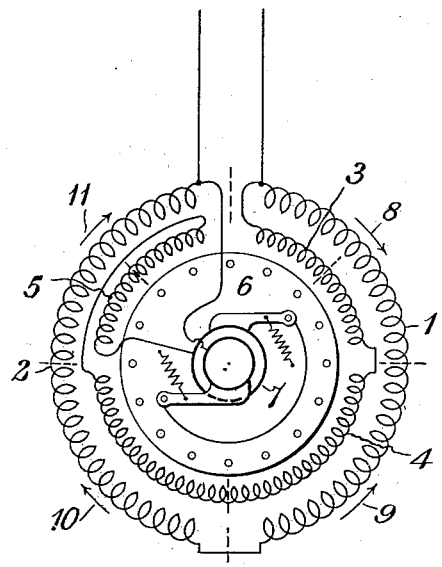
Figure 3:
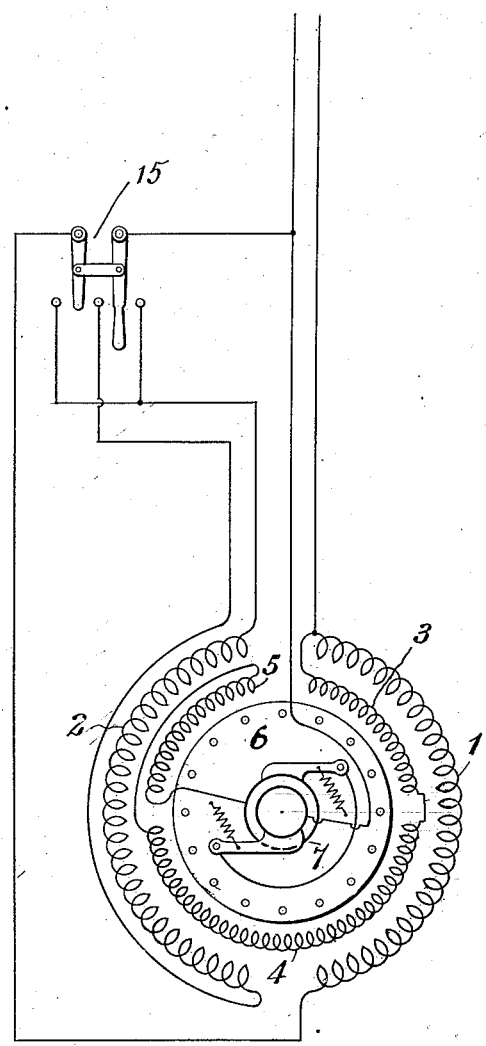
Figure 2:
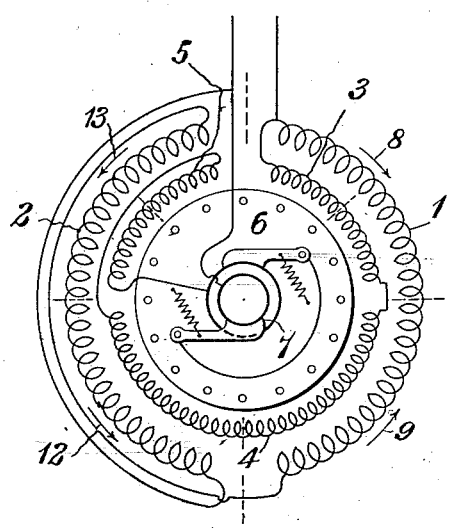

My invention is illustrated diagrammatically in the accompanying drawings, Figure 1 of which shows the connections of the windings as made within a motor for slow speeds. Fig. 2 shows the windings of the motor shown in Fig. 1 when arranged for a higher speed, and Fig. 3 illustrates an external controller for changing the circuit connections of the motor.

For the sake of simplicity, the invention is here shown as applied to motors in which the main windings may be arranged to produce either two or four poles, though, of course, it will be readily understood that it is not restricted, in its application, to such motors, but may be employed equally well in connection with motors in which the windings are adapted to produce other numbers of poles bearing either the same ratio as that above specified or a different ratio.

Each of the motors illustrated comprises a main winding of low ohmic resistance that is divided into two sections 1 and 2, an auxiliary winding of high ohmic resistance consisting of three sections 3, 4, and 5, and a rotatable secondary member 6 that carries parts of a suitable centrifugally actuated switch 7, such as that shown, whereby the circuit of the auxiliary winding is interrupted, in the usual manner, when the motor attains a predetermined speed. The sections 3 and 4 of the auxiliary primary winding are adapted to produce fluxes of the same sign simultaneously, and, since the section 4 is of approximately twice the length or polar pitch of the sections 3 and 5, approximately three-fourths of the auxiliary winding produces a flux of one sign. The section 4 of the auxiliary winding produces a pole the center of which is disposed approximately midway between the adjacent extremities of the sections 1 and 2 of the main primary winding, the centers of the poles produced by the sections 3 and 5 being disposed approximately 135 electrical degrees therefrom.

In Fig. 1, sections 1 and 2 of the main primary winding are arranged to produce poles of the same sign simultaneously, the poles of the opposite sign being consequent and disposed midway between the poles which correspond, in position, to the windings. The motor then has four poles and operates at its lower speed. In Fig. 2, however, the sections 1 and 2 produce poles of opposite sign, there then being only two poles, with the result that the motor will operate at its higher speed. The connections and arrangements of the auxiliary winding remain the same, irrespective of the number of poles produced by the main winding.

In order to understand the mode of operation of the invention, Figs. 1 and 2 should be considered separately with particular regard to the directions of the torques or rotating fields produced respectively by adjacent coöperating portions of the windings. In Fig. 1 a torque or rotating field will be produced in the direction of the arrow 8 by section 3 of the auxiliary winding acting in conjunction with section 1 of the main winding, since the auxiliary winding is of high ohmic resistance and low inductance and the current therein leads that in the main winding, which is of lower ohmic resistance and high inductance, and the rotating field moves away from the pole produced by the current that is in the lead and toward the pole produced by the current that lags. For the same reason, section 4 of the auxiliary winding, coöperating with section 1 of the main winding, causes a rotating field in the direction of the arrow 9, and, coöperating with section 2 of the main winding, causes a rotating field in the direction of the arrow 10. Similarly, section 5 of the auxiliary winding, coöperating with section 2 of the main winding, causes a rotating field in the direction of the arrow 11. It will be observed that the arrows 9 and 10 are oppositely directed, the result being that the rotating fields represented thereby consequently neutralize each other, and rotation of the member 6 is effected only by the fields represented by the arrows 8 and 11.

In Fig. 2 the rotating fields produced by the sections 3 and 4 of the auxiliary winding, coöperating with section 1 of the main winding, are similarly directed, as in Fig. 1, and are also designated by the arrows 8 and 9. Sections 4 and 5 of the auxiliary winding, however, coöperating with section 2 of the main winding now produce rotating fields represented by arrows 12 and 13. It will be observed that the arrows 8 and 13 are now oppositely directed, whereas the arrows 9 and 12 are similarly directed and accordingly produce rotation of the member 6. Thus it is seen that, whether the main primary winding is arranged to produce two or four poles, the auxiliary winding serves to effect starting of the motor. It is, of course, true that only one-half of the torques exerted within the motor are available for useful purposes in each case, but that is sufficient to cause the motor to attain such speed that the auxiliary winding may be thrown out of service by the centrifugal switch and the main winding be relied upon to effect further increase of speed until full speed is attained.

When the motor is to be used continuously, or during long periods of time for operation at one speed, it may be desirable to connect the windings permanently for that speed, as illustrated in Figs. 1 and 2, but if the motor is to be used intermittingly for operation at the different speeds for which it may be adapted, an external switch 15 may be employed for changing the connections to the motor, the switch here shown being only illustrative of any suitable and convenient means that may be employed for the purpose. In order to connect the main windings of the motors for four poles and the lower speed, the switch 15 should be moved to the right, the connections thus effected being illustrated in Fig. 1, and, if it is desired to operate the motor at the higher speed, the switch 15 should be moved to the left, in which case the connections effected will be those illustrated in Fig. 2.

I claim as my invention:

1. In a single-phase induction motor, the combination with a main primary winding adapted for circuit connections to produce a plurality of numbers of magnetic poles, of an auxiliary winding adapted to coöperate with the main winding in starting the motor and without change in its circuit connections for different numbers of poles of the main winding.

2. In a single-phase induction motor, the combination with a main primary winding adapted for circuit connections to produce two numbers of magnetic poles, one of which is double the other, of an auxiliary winding adapted to coöperate with the main winding in starting the motor and without change in its circuit connections for different numbers of poles of the main winding.

3. In a single-phase induction motor, the combination with a main primary winding adapted for circuit connections to produce a plurality of numbers of magnetic poles, of an auxiliary winding, one-half of which is effective to coöperate with the main winding in starting and without change in its circuit connections for different numbers of poles of the main winding.

4. In a single-phase induction motor, the combination with a main primary winding adapted for circuit connections to produce a plurality of numbers of magnetic poles, of an auxiliary winding adapted to coöperate with the main winding in starting the motor and three-fourths of which is adapted to produce a flux of one polarity.

5. In a single-phase induction motor, the combination with a main distributed primary winding comprising two polar sections and adapted for circuit connections to produce either two or four poles, of an auxiliary distributed winding comprising three sections one of which is of approximately double the polar pitch of the other two and the center of the pole produced by which is disposed between extremities of the sections of the main winding, and the centers of the poles produced by the other two sections of the auxiliary winding being disposed approximately 135 electrical degrees therefrom.

In testimony whereof, I have hereunto subscribed my name this 3rd day of September, 1908.

WALTER J. BRANSON.

Witnesses:
F. R. KUNKEL,
BIRNEY HINES.